Figure 1:
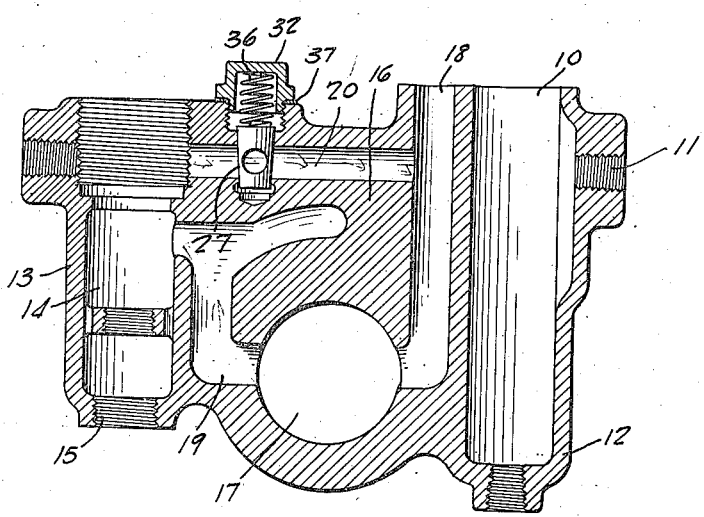

Feb. 15, 1938.  W. CZARNECKI  2,108,432

STRAINER, PUMP, AND PRESSURE REGULATING UNIT

Filed June 1, 1936

Inventor
WALTER CZARNECKI
By Joshua R. H. Potts
Attorney

Patented Feb. 15, 1938

2,108,432

UNITED STATES PATENT OFFICE 2,108,432

STRAINER, PUMP, AND PRESSURE REGULATING UNIT

Walter Czarnecki, Eddington, Pa., assignor, by mesne assignments, to Eddington Metal Specialty Co., Eddington, Pa., a firm Application June 1, 1936, Serial No. 82,841

2 Claims. (Cl. 103—41)

This invention relates to apparatus which is normally employed in conjunction with the delivery of fuel to an oil burner, and is concerned primarily with a unit which ordinarily constitutes a housing for a liquid strainer and a pressure regulating valve, between which are interposed means for mounting a pump which is effective to build up pressure as the liquid fuel is delivered to the pressure regulating valve.

In the actual present day service use of oil burners it is an essential requirement that a certain predetermined pressure be built up on the liquid fuel prior to delivery to the oil burner, and to this end certain pumps are employed in conjunction with a pressure regulating valve. The latter normally is effective to prevent delivery of the fuel to the burner until a certain predetermined pressure on the fuel has been attained, and this pressure regulating valve is also operable to bypass excess fuel back to the fuel line ahead of the pump when a predetermined pressure has been reached.

It is evident, therefore, that the pressure regulating valve accurately controls delivery of the fuel to the burner, so that the liquid fuel is delivered only between certain limits of pressure.

When the pump is started up, to initiate delivery of the liquid fuel to the burner, there is a certain amount of so-called residual air throughout the several passages of the unit, and the release of this air from the system, as the pressure is built up and circulation of the liquid fuel attained, becomes an important desideratum.

To the end of convenience in handling and installation there have been proposed certain units in which a liquid strainer for the fuel mounting for the pump and pressure regulating valve are all combined as a single unit, and this unit ordinarily includes a bypass from the pressure regulating valve back to the fuel line, which delivers liquid fuel from the strainer to the pump.

With the foregoing conditions in mind, this invention has in view, as an important objective, the provision of a unit of the character above noted, in which an air vent is included in the bypass from the pressure regulating valve.

At certain times it becomes desirable to cut off the communication which is normally established by the bypass, such as during that period when the pump is being started in operation, to build up the pressure, and this invention has in view as a further object the provision of a device which is intended to function as an air vent, as above noted, but which device also may be adjusted to constitute the same, a valve for controlling communication through the bypass.

In carrying out this idea in a practical embodiment, the casting defining the unit is provided with a suitable socket on one side of the bypass, and a recess on the other, in which socket and recess is received a plug member, which plug member is formed with a passageway therethrough which is adapted to become aligned with the passageway of the bypass. However, when the plug member is adjusted so that this alignment of the passage in the valve member is across, or out of alignment with the passage of the bypass, the latter will be blocked off, and the communication ordinarily established thereby cut off.

Inasmuch as it is important to provide for the venting of the air when the communication of the bypass is cut off, the valve member is provided with a small opening which communicates with the main cross passage therein. This valve member is also provided with another small passageway, which extends from the cross passage to the top of the valve member which is adapted to be open to the atmosphere, so that when the valve is in so-called closed position air may be vented from the system of the unit to the atmosphere.

Another more detailed object of the invention lies in the provision of means for maintaining the above noted valve member in proper adjusted position in the casing. To this end, the casing is provided with a threaded socket above the valve member, and a cap member is screwed into this socket. A spring is interposed between the cap member and the valve, so that when the cap member is threaded down, a yielding pressure will be exerted on the valve member to hold the latter in an adjusted position.

Obviously this cap member may be removed to permit of adjustment of the valve member.

Various other more detailed objects and advantages will in part become apparent, and in part be hereinafter stated, as the description of the invention proceeds.

The invention, therefore, comprises a liquid strainer and pressure regulating unit of the character above noted, which includes a bypass, and with which bypass is associated a valve which also constitutes an air vent for venting air from the system of the unit.

Figure 2:
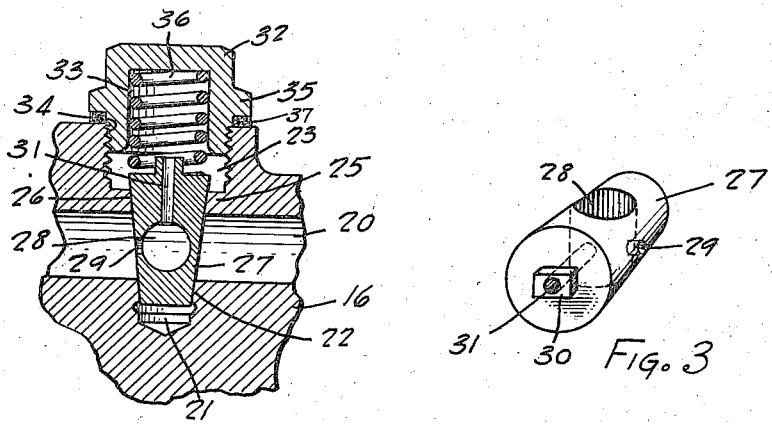
Figure 3:
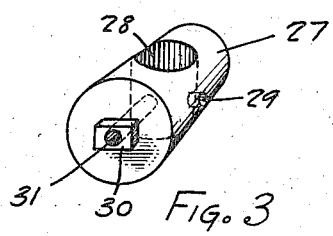

For a full and more complete understanding of the invention, reference may be had to the following description and accompanying drawing wherein Figure 1 is a view taken as a section through a unit, in which a valve for the bypass and air vent is included in accordance with the precepts of this invention, Figure 2 is an enlarged detailed view, also in section, of the valve member which is located in the bypass, and Figure 3 is an enlarged detailed showing of the valve member per se.

Referring now to the drawing, wherein like reference characters denote corresponding parts, a liquid strainer and pressure regulating unit of the type with which this invention is concerned is shown in Figure 1.

Such a unit is ordinarily made as a casting, which is formed with a recess at 10, which is intended to receive the strainer apparatus. This strainer apparatus is not herein illustrated and described, as any of the now well-known types of strainer apparatus adapted for this use may be employed. It is noted that the casting is formed with an opening at 11, which is intended to admit liquid fuel from the source of supply to the strainer.

That portion of the casting which surrounds the recess 10 is of a somewhat enlarged construction, and is referred to by the reference character 12. At the other side of the casting there is also a somewhat enlarged portion, designated 13, which is formed with a recess 14, which is intended to receive the pressure regulating valve mechanism.

This pressure regulating valve mechanism is also not herein illustrated and described, as pressure regulating valves of this type are now well-known in the art.

The enlarged portion 13 is formed at the bottom with a threaded opening 15, to which is connected a line which leads to the burner, so that fuel under pressure is delivered from the regulating valve in the recess 14, to the fuel burner.

Intermediate the enlarged portions 12 and 13 the casting is formed with a portion which is somewhat reduced in thickness, and which is referred to generally by the reference character 16. This portion, which is reduced in thickness, is formed with a circular opening at 17, and this opening 17 is intended to receive a pump, of the type commonly employed, for the purpose of building up pressure on the liquid fuel.

The intermediate portion 16 is formed with a passageway 18 that extends from the upper end of the casting to the pump 17. A cap, not shown, is ordinarily associated with the casting illustrated in the drawing, and this cap cooperates with the casting to define a passageway from the strainer of the recess 10 to the passageway 18, so that fuel from the strainer passes through the passageway 18 to the pump in the recess 17.

The reduced portion 16 is also formed with another passage at 19, which extends from the opening 17 to the opening 14, and fuel under pressure is delivered through this passage to the pressure regulating valve in the recess 14. As shown in Figure 1, the reduced portion 16 is also formed with another passage 20, which extends from the recess 14 across to the passageway 18, and this passage 20 constitutes a bypass, and when this bypass 20 is left unrestricted fuel may be bypassed from the pressure regulating valve in the recess 14 back to the passageway 18.

Referring now more particularly to Figure 2, the intermediate portion 16 of the casting is shown as formed on one side of the bypass 20 with a socket 21, which is formed with a truncated conical wall 22 that terminates at its upper end in the bypass 20. Substantially opposite to the socket 21, the casting is formed with a large socket in a comparatively large recess 23, the walls of which are threaded, as shown at 24.

Between the bottom of the socket 23 and the bypass 20 there is a wall which is identified as 25, and this wall is provided with an opening which is defined by a truncated conical wall 26, which constitutes for all effective purposes a substantial continuation of the truncated conical wall 22.

A valve member, indicated at 27, is of a truncated conical formation to provide for its being received in the conical walls 22 and 26. This valve member 27 is formed with a cross passage 28, and a small opening 29 extends through the side wall of the valve member 27 to the cross passage 28.

The complemental valve member 27 is formed with a projection 30, and a small passage 31 extends through this projection and down through the body of the valve member to the cross passage 28.

As shown in Figure 2 the valve member 27 is received at its lower end in the socket 21 on one side of the bypass 20, and at its upper end in the conical opening 26. A cap member designated 32 is formed with a socket 33, and an exteriorly threaded lower portion 34. This cap member 32 is also formed with an intermediate flange 35. A spring 36 is received in the socket 33 and engages the upper end of the valve member 27 about the projection 30.

The lower portion of the cap member 32, formed with threads 34, is threaded into the socket 23, the threads 34 being screwed into the threads 24, and a gasket shown at 37 is interposed between the flange 35 and the top of the casting about the socket 23.

When oil is to be delivered to the burner from the threaded opening 15, the pump in the opening 17 is started in operation, and at this time the valve member 27 will be adjusted to the position shown in Figure 2. In this position the openings 29 and 31 are open to the atmosphere when the cap 32 is removed, so that while communication of the bypass 20 is cut off, air in the system of the unit may be vented to the atmosphere.

When an appropriate time has been reached the valve member 27 may be adjusted so that the cross passage 28 therein is in substantial alignment with the passage 20, and a cap member 32 may now be screwed down so that sufficient pressure is exerted by the spring 36 on the valve member 27, to properly maintain the latter in its adjusted position.

At the same time a good seal is provided by the gasket 37, and when a certain predetermined pressure is reached in the fuel which is delivered to the pressure regulating valve, any building up of an excess pressure will cause fuel to be delivered back through the bypass 20 to the passageway 18, rather than cause an increase in pressure in the fuel which is delivered to the burner.

While a preferred specific embodiment of the invention is hereinbefore set forth, it is to be clearly understood that I am not to be limited to the exact construction illustrated and described, because various modifications of these details may be provided in putting the invention into practice within the purview of the appended claims.

I claim:

1. A liquid strainer, pump, and pressure regulating unit comprising a main body portion which consists of a casting formed with a recess for housing the liquid strainer, a recess for housing a pump and a recess for housing a pressure regulating valve, said casting also being formed with a main passage establishing direct communication between the strainer recess and the pressure regulating valve recess, said casting being formed with a socket on one side of said main passage and with a recess on the opposite side of said main passage substantially opposite to said socket, and a valve member fitting in said recess and socket and extending across the main passage, said valve member being formed with a transverse opening for controlling flow through said main passage, and being adapted to assume different positions whereby communication in said main passage is opened or cut off, as occasion demands, said valve member also being formed with a passageway establishing communication between said transverse opening and the exterior of the casting, and also with a small opening leading into said transverse opening to establish communication between the said main passage and the said transverse opening when flow through said main passage is cut off by said valve member, said last mentioned opening and passageway constituting an air vent.

2. A liquid strainer, pump, and pressure regulating unit comprising a main body portion which consists of a casting formed with a recess for housing the liquid strainer, a recess for housing a pump and a recess for housing a pressure regulating valve, said casting also being formed with a main passage establishing direct communication between the strainer recess and the pressure regulating valve recess, said casting being formed with a socket having a truncated conical wall opening into the main passage, a recess opening into said passage on the side thereof opposite to said socket and having a truncated conical wall constituting a substantial continuation of said first mentioned truncated conical wall, said last mentioned recess being enlarged, a conical valve member received in said recess and socket and formed with a transverse opening for controlling flow through the main passage, said valve member also being formed with an opening in its conical wall leading from the main passage into the transverse opening when the transverse opening is set to block flow through said main passage and with a passageway extending from the transverse opening to the top of the valve member, the enlarged portion of the recess being threaded, a cap screwed in said threaded recess, and a spring member interposed between said cap and valve member.

WALTER CZARNECKI.